(12) United States Patent
Griffin

(10) Patent No.: US 7,974,091 B2
(45) Date of Patent: Jul. 5, 2011

(54) HANDHELD ELECTRONIC DEVICE AND HINGE ASSEMBLY

(75) Inventor: Jason T. Griffin, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 182 days.

(21) Appl. No.: 12/394,683

(22) Filed: Feb. 27, 2009

(65) Prior Publication Data

US 2010/0220442 A1 Sep. 2, 2010

(51) Int. Cl.
*H05K 7/16* (2006.01)
(52) U.S. Cl. ......... 361/679.56; 361/679.55; 361/679.57; 16/382
(58) Field of Classification Search ............. 361/679.55, 361/679.56, 679.01; 16/367, 382, 387
See application file for complete search history.

(56) References Cited

U.S. PATENT DOCUMENTS

| 5,742,912 | A | 4/1998 | Nishiyama et al. |
| 7,565,185 | B2 * | 7/2009 | Kang et al. ................ 455/575.3 |
| 2006/0037175 | A1 | 2/2006 | Hyun |
| 2006/0238962 | A1 * | 10/2006 | Son et al. ...................... 361/679 |
| 2007/0157428 | A1 * | 7/2007 | Kim ............................... 16/221 |
| 2008/0102907 | A1 * | 5/2008 | Komine .................... 455/575.3 |
| 2008/0157754 | A1 | 7/2008 | Kim et al. |
| 2009/0133224 | A1 * | 5/2009 | Hanigan ........................ 16/382 |

FOREIGN PATENT DOCUMENTS

EP 1 467 539 A2 10/2004
* cited by examiner

*Primary Examiner* — Jayprakash N Gandhi
*Assistant Examiner* — Ingrid Wright
(74) *Attorney, Agent, or Firm* — Alexander Anishchenko; Borden Ladner Gervais LLP

(57) ABSTRACT

A hinge assembly for a handheld electronic device is provided. The hinge assembly includes a housing having a first portion and a second portion. The hinge assembly comprises a primary member structured to hingedly couple the first portion to the second portion and a secondary member coupled to, and generally pivotable about, the primary member.

20 Claims, 4 Drawing Sheets

HANDHELD ELECTRONIC DEVICE AND HINGE ASSEMBLY

BACKGROUND

1. Field

The disclosed concept relates generally to handheld electronic devices and, more particularly, to hinge assemblies for handheld electronic devices.

2. Description of the Related Art

Numerous types of handheld electronic devices are known. Examples of such handheld devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Such handheld electronic devices are generally intended to be portable, and thus are of a relatively compact configuration in which keys and other input structures often perform multiple functions under certain circumstances or may otherwise have multiple aspects or features assigned thereto. With advances in technology, handheld electronic devices are built to have progressively smaller form factors yet have progressively greater numbers of application and features resident thereon.

As a result of their relatively small size, handheld electronic devices can be, and often are, kept in a pocket, a purse, or are otherwise suitably stowed in close proximity to its owner. Under such circumstances, when the handheld electronic device is not in use, it is desirable to protect the keys and/or other features of the device, and to avoid unintentional actuation thereof. To this end, some handheld electronic devices have been designed to include a foldable or flip structure. The housing of such devices generally comprises two portions or halves that are joined by a hinge mechanism and are foldable one on top of the other. However, the hinge mechanisms of foldable handheld electronic devices are generally too small and thus, are not robust enough and are susceptible to damage. Those that are sufficiently robust tend to be excessively large and bulky and, therefore, undesirably protrude from the form factor of the device.

BRIEF DESCRIPTION OF THE DRAWINGS

A full understanding of the disclosed concept can be gained from the following description of the preferred embodiments when read in conjunction with the accompanying drawings in which.

DESCRIPTION

Figure 1:
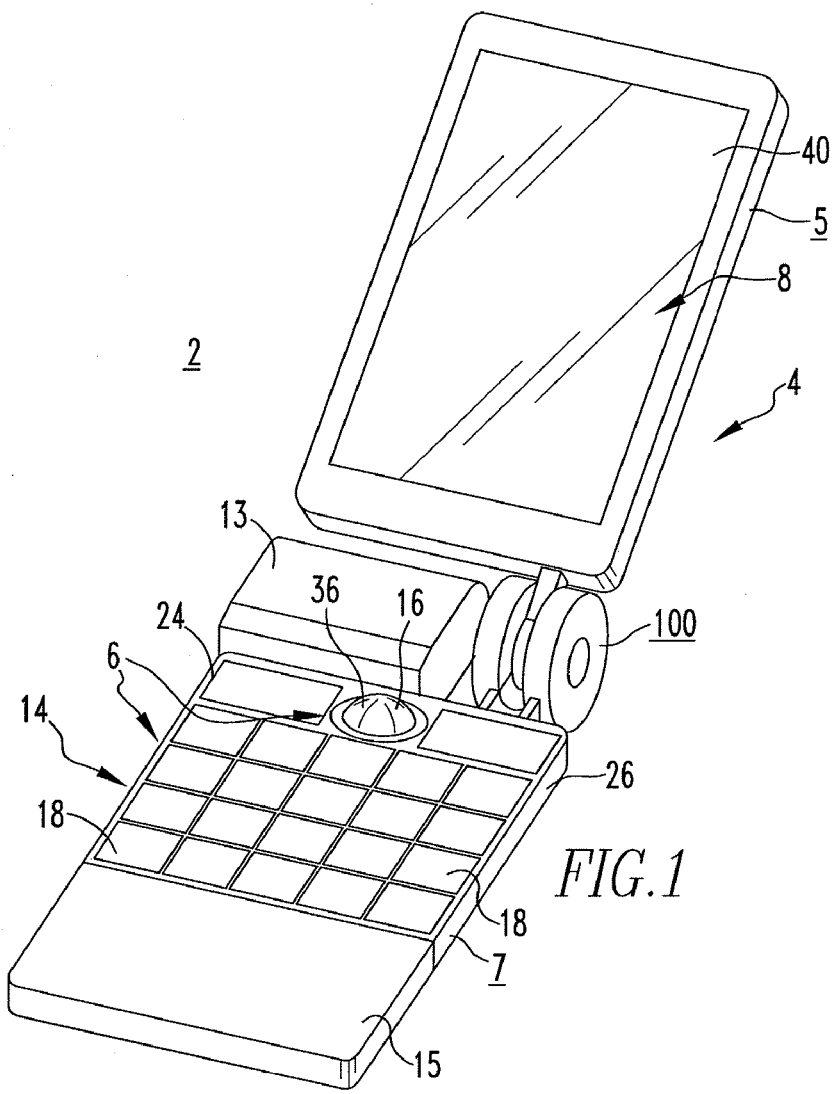
FIG. 1 is a perspective view of an improved handheld electronic device and hinge assembly therefor, in accordance with an embodiment of the disclosed concept.

Directional phrases used herein, such as, for example, upper, lower, left, right, vertical, horizontal, top, bottom, above, beneath, clockwise, counterclockwise and derivatives thereof, relate to the orientation of the elements shown in the drawings and are not limiting upon the claims unless expressly recited therein.

As employed herein, the phrase "form factor" refers to the overall shape and configuration of the handheld electronic device and, in particular, the general shape which is defined by the exterior surface of the housing of the device when the device is disposed in the closed or folded position.

As employed herein, the terms "fastener" and "fastening mechanism" refer to any known or suitable connecting, securing or tightening material, structure or device and expressly includes, but is not limited to tabs, flanges and other suitable protrusions for securing one component to another, as well as receptacles (e.g., without limitation, recesses; slots; sockets; grooves), combinations of interlocking protrusions and receptacles, and devices such as pins, rivets, screws, bolts and any suitable combination of bolts, nuts (e.g., without limitation, lock nuts) and/or washers.

As employed herein, the statement that two or more parts are "coupled" together shall mean that the parts are joined together either directly or joined through one or more intermediate parts.

As employed herein, the term "number" shall mean one or an integer greater than one.

Figure 2:
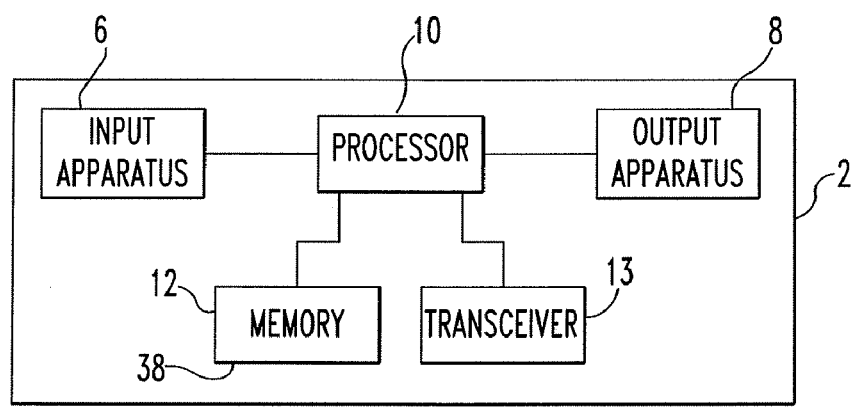
FIG. 2 is a schematic depiction of the handheld electronic device of FIG. 1.

An embodiment of a handheld electronic device 2 in accordance with the disclosed concept is depicted generally in FIG. 1 and schematically in FIG. 2. The handheld electronic device 2 includes a housing 4 upon which are disposed a processor unit that includes an input apparatus 6, an output apparatus 8, a processor 10, a memory 12, a wireless transceiver 13, and a removable battery portion 15. The processor 10 may be, for example, and without limitation, a microprocessor ($\mu P$), and is responsive to inputs from the input apparatus 6 and provides output signals to the output apparatus 8. The processor 10 also interfaces with the memory 12 which contains one or more routines. The processor 10 and the memory 12 together form a processor apparatus.

Referring to FIG. 1, the input apparatus 6 includes a keypad 14 and a navigational input member 16. The keypad 14 includes a plurality of keys 18 that serve as input members. Many of the keys 18 each have a plurality of characters assigned thereto. It is noted, that the keypad 14 may be of numerous configurations, such as, without limitation, an AZERTY keyboard, a QWERTY keyboard, a QWERTZ keyboard or another keyboard arrangement, whether or not reduced, and whether presently known or unknown.

The keys 18 are located on a front face 24 of the housing 4, along with the navigational input member 16, which is in the exemplary form of a trackball 36. The trackball 36 is rotatable in various directions thereby allowing for the navigation of a cursor, which may be displayed on the output apparatus 8, in various directions including up, down, left, right, and any combination thereof. Moreover, the trackball 36 can also be depressed to provide a selection or other input based upon the current location of a cursor (not shown). Accordingly, rotation of the trackball 36 can navigate a cursor over a particular program icon, while depression of the trackball 36 can launch the program. It will be appreciated, however, that any known or suitable navigational input member other than the trackball 36 could be employed, without departing from the scope of the disclosed concept. For instance, a touch pad (not shown) input member which could be disposed, for example, on the front face 24 of the housing 4 proximate the keys 18, or a trackwheel (not shown), which could be disposed on a side 26 of the housing 4, can be used in lieu of the trackball 36. Similar to the trackball, the trackwheel can serve as an input member since the trackwheel is capable of being rotated in a clockwise or a counterclockwise direction as well as being depressed. Rotation of the trackwheel can provide a navigation or other input, while depression of the trackwheel can provide a selection or other input. For example, if a cursor is located over a given program icon, that program will be launched when the trackwheel is depressed.

Referring to FIG. 2, the memory 12 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. As can be seen from FIG. 2, the memory 12 is in electronic communication with the processor 10. The memory 12 additionally can include one or more routines, depicted generally with the numeral 38, for the processing of data. The routines 38 can be in any of a variety of forms such as, for example and without limitation, software, firmware, and the like. The output apparatus 8 includes a display 40. Examples of handheld electronic devices, and the aforementioned features thereof, are included in U.S. Pat. Nos. 6,452,588 and 6,489,950, which are incorporated by reference herein.

Figure 5:
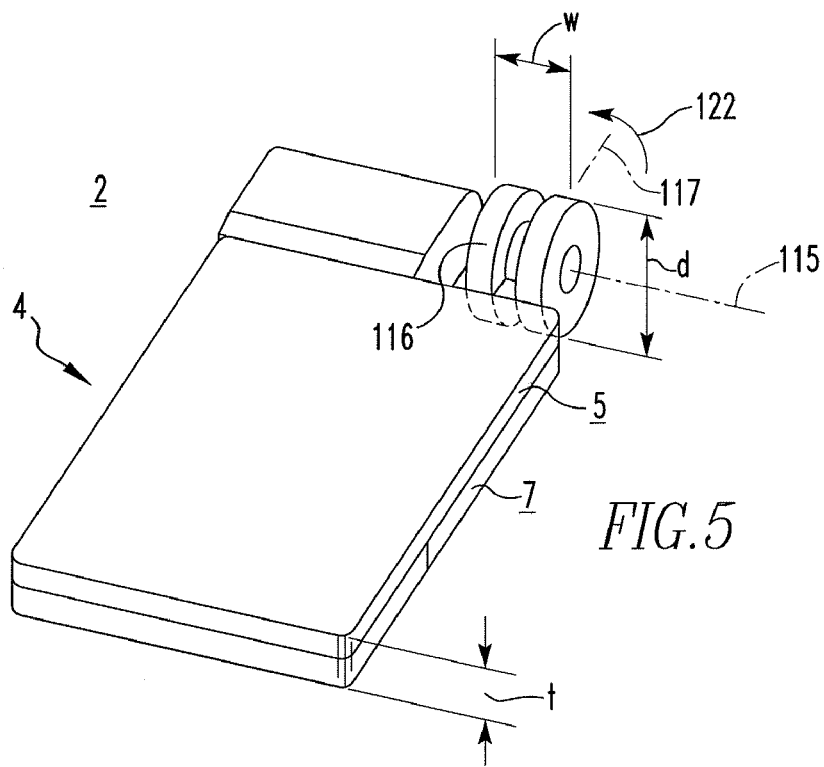
FIG. 5 is a perspective view of the handheld electronic device of FIG. 1 shown in the closed position, prior to the hinge assembly being pivoted to substantially conform with the form factor of the device.
Figure 6:
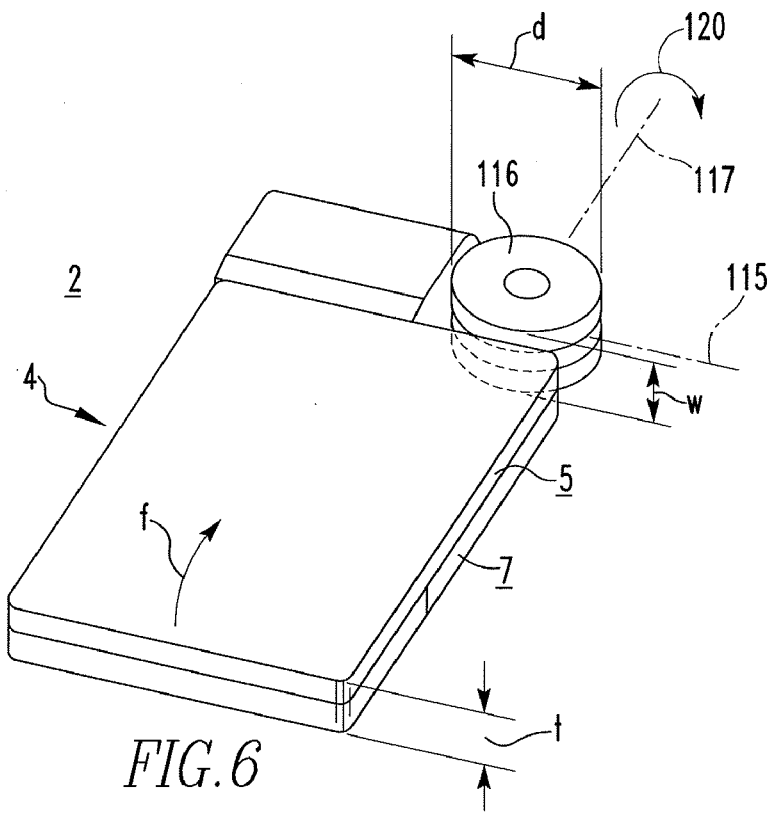
FIG. 6 is a perspective view of the handheld electronic device of FIG. 3A showing the hinge assembly after being pivoted to substantially conform with the form factor of the device.

As shown in FIG. 1, the handheld electronic device 2 is of the "flip" or "foldable" variety which, as will be described in greater detail hereinbelow, refers to the ability of the device 2 to be operable between an "open" position, such as shown in FIG. 1, and a "closed" position, such as shown in FIGS. 5 and 6. Specifically, the housing 4 of the handheld electronic device 2 generally includes two portions, a first portion 5 and a second portion 7, with the first and second portions 5,7 being pivotally coupled together by way of an improved hinge assembly 100 in accordance with the disclosed concept. Preferably, hinge assembly 100 is positioned generally away from a longitudinal centerline of the handheld electronic device 2 and close to one side 26 of housing 4. Accordingly, in the example shown and described herein, the aforementioned output apparatus 8, which is in the exemplary form of a display and is disposed on the first portion 5 of the housing 4, is covered and thus protected by the second portion 7 of the housing 4, which contains the input apparatus 6, when the handheld electronic device 2 is in the "closed" position. It will, however, be appreciated that the aforementioned components of the handheld electronic device 2 and/or additional suitable components (not shown) could be disposed on the first and/or second portions 5,7 of the housing 4 in any suitable alternative configuration (not shown), without departing from the scope of the disclosed concept.

Figure 3:
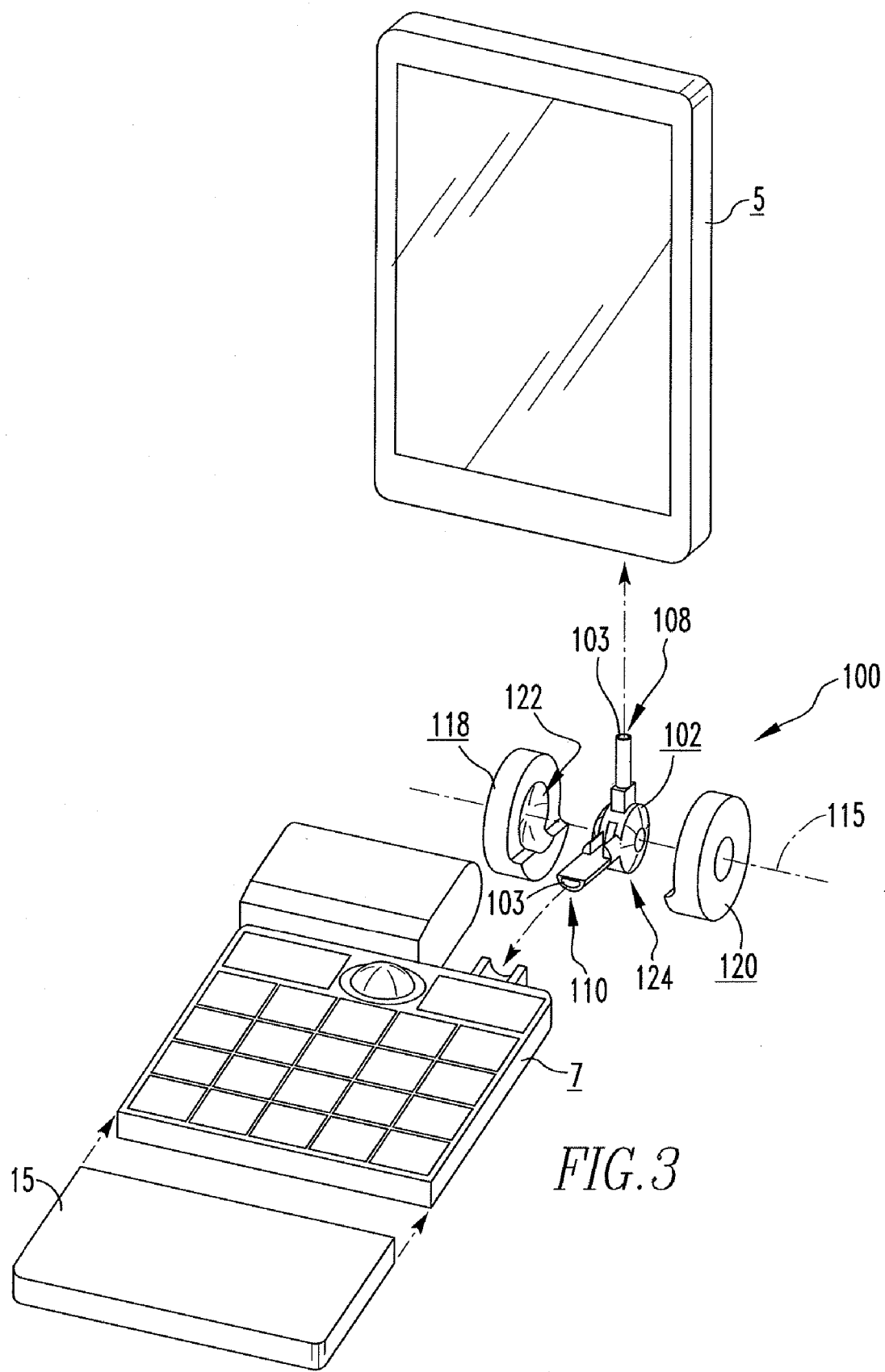
FIG. 3 is an exploded perspective view of the handheld electronic device and hinge assembly therefor of FIG. 1
Figure 4:
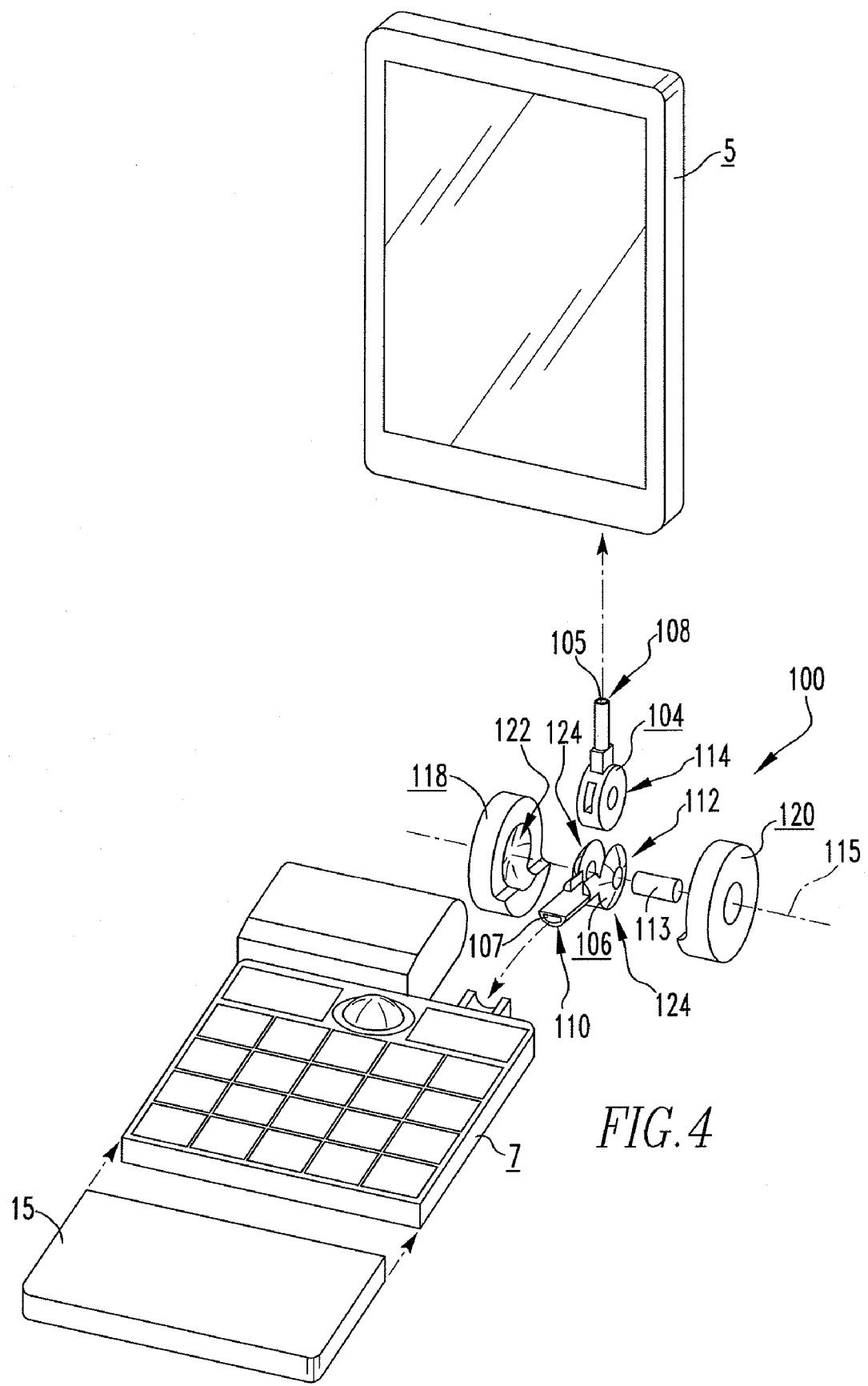
FIG. 4 is another exploded perspective view of the handheld electronic device and hinge assembly therefor of FIG. 1.

Referring to the exploded views of FIGS. 3 and 4, the hinge assembly 100 generally includes a primary member 102 (FIG. 3) having a first hinge member 104 and a second hinge member 106 (FIG. 4). First hinge member 104 includes a first end 108 coupled to the first portion 5 of the housing 4. Such coupling may be fixed or rotatable, as will discussed further below. Second hinge member 106 includes a first end 10 preferably fixedly coupled to the second portion 7 of the housing 4 and an opposite second end 112 rotatably coupled, such as, without limitation via a pin member 113 to an opposite second end 114 of the first hinge member 104. Such rotatable coupling between the first and second hinge members 104, 106 of the primary member 102 allows for the first hinge member 104 to pivot with respect to the second hinge member 106 generally about first axis 115. Accordingly, the first portion 5 of the device 2 may "flip" with respect to the second portion 7 about first axis 115, between an "open" position such as shown in FIG. 1 and a "closed" position such as shown in FIGS. 5 and 6.

Referring to FIG. 3, the primary member 102 of hinge assembly 100 includes a conduit portion 103 extending generally therethrough. More particularly, conduit portion 103 includes a first conduit portion 105 in first hinge member 104 and a second conduit portion 107 in second hinge member 106, as shown in FIG. 4. Such conduits allow for wires to pass between the first and second portions 5,7 of the housing 4.

Referring to FIGS. 3-6, hinge assembly 100 further includes a secondary member 116 having a width w and depth d. Preferably, the width w is about 40 to 70 percent of the depth and generally equal to the thickness t of the closed housing 4.

In the embodiment depicted in FIGS. 3 and 4, secondary member 116 includes a first half 118 and a second half 120 coupled together to form secondary member 116. Each of the first and second halves 118,120 preferably include a generally concave region 122 (as shown on first half 118 in FIGS. 3 and 4). Each of the concave regions 122 are preferably adapted to generally fit a corresponding convex region 124 of second hinge member 106. The concave and convex regions 122,124 are dimensioned to interact similar to a ball and socket, thus allowing the secondary member 116 to be generally pivotable about the primary member 102 when the first and second hinge members 104,106, and thus the first and second portions 5,7 of the housing 4, are positioned in the "closed" position, as shown in FIGS. 5 and 6. More particularly, the secondary member 116 generally pivots, or rotates about axis 117. Preferably, axis 117 is oriented generally perpendicular to axis 115, as shown in FIGS. 5 and 6.

As shown in FIG. 5, when the housing 4 is in the "closed" position, secondary member 116 may be positioned in a first position in which the secondary member 116 of hinge assembly 100 extends beyond the form factor of the handheld electronic device 2. When in such first position, the first and second portions 5,7 of the housing 4 may pivot between the "open" and "closed" positions previously discussed.

While the housing 4 is still in the "closed" position, secondary member 116 may be positioned in a second position in which the secondary member 116 of hinge assembly 100 lies within, and thus does not extend beyond, the form factor of the handheld electronic device 2, such as shown in FIG. 6. When in such second position, the first and second portions 5,7 of the housing 4 are constrained and thus cannot pivot between the "open" and "closed" positions previously discussed. Accordingly, placement of the secondary member 116 in the first position may be termed an "unlocked" position, while placement of the secondary member in any other position, such as the second position, may be termed a "locked" position.

The handheld electronic device 2 may further include a mechanism or sensor (not shown) for determining the position of the secondary member 16. Such sensor may be employed to control various functions of the handheld electronic device 2. For example, without limitation, a user may desire to have an audible ringer setting switched to a vibrate notification when the device 2 is "locked" position (i.e., secondary member 116 is in the "locked" position). Such feature may readily be provided by triggering the switch of notification when it is detected that the secondary member 116 is in the "locked" position.

Positioning of the secondary member 116 among the first and second positions may be readily accomplished by simply rotating or pivoting the secondary member 116 about the second axis 117. For example, to transition from the "unlocked" position to the "locked" position, the secondary member 116 is rotated about the second axis 117 in a direction shown generally by arrow 120 in FIG. 5. Conversely, in order to transition from the "locked" position to the "unlocked" position, secondary member 116 is rotated about the second axis 117 in a direction shown generally by arrow 122 in FIG. 6.

It is to be readily appreciated that secondary member 116 serves a dual purpose. When positioned in the "unlocked" position, secondary member serves to reinforce and thus strengthen primary member 102, thus providing a robust hinge member 100. Additionally, when in the "locked" position, secondary member 116 acts to secure the first and second portions 5,7 of the housing 4 in the "closed" position thus helping to protect the input apparatus 6 and the output apparatus 8 from undesired contact when not in use.

Although not expressly shown in the Figures, it is to be appreciated that the structure and placement of the hinge assembly 100 may also provide a secondary "flip" feature. More particularly, when first end 108 of first hinge member 104 is rotatably coupled to the first portion 5 of the housing 4, first portion 5 may be allowed to "flip" open from second portion 7 in a direction as shown generally by arrow f in FIG. 6. In such embodiment, the first portion 5 would rotate about an axis (not shown) that is generally parallel to, and spaced a slight distance above, second axis 117. Additionally, the rotational coupling of the first end 108 of first hinge member 104 to first portion 5 could also be utilized in conjunction with the pivoting of the first and second hinge members 104,106 to provide various orientations of the first portion 5 of the housing 4 with respect to the second portion 7 when the housing is in an open position.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A hinge assembly for a handheld electronic device including a housing having a first portion and a second portion, the hinge assembly comprising:
    a primary member structured to hingedly couple the first portion to the second portion, the primary member configured to move between a closed position and an open position; and
    a secondary member coupled to and partially surrounding the primary member, the secondary member being configured to move about the primary member when the primary member is in the closed position, from
        an unlocked position, in which the primary member is permitted to move to the open position, to
        a locked position, in which the primary member is prevented from moving to the open position.

2. The hinge assembly of claim 1 wherein the primary member comprises a first hinge member and a second hinge member; wherein the first hinge member is structured to be coupled to the first portion of the housing; wherein the second hinge member is structured to be coupled to the second portion of the housing; and wherein the first hinge member may pivot relative to the second hinge member about a first axis.

3. The hinge assembly of claim 2 wherein the secondary member pivots about a second axis, said second axis being oriented generally perpendicular to said first axis.

4. The hinge assembly of claim 1 wherein the housing of the handheld electronic device has a form factor; and wherein the secondary member is structured to be pivotable between a first position corresponding to the secondary member extending beyond the form factor, and a second position corresponding to the secondary member not extending beyond the form factor.

5. The hinge assembly of claim 1 wherein the hinge assembly has a width and a depth; and wherein the width is about 40 to about 70 percent of the depth.

6. The hinge assembly of claim 1 wherein the housing of the handheld electronic device has a longitudinal centerline extending through the first portion of the housing and the second portion of the housing; and wherein the hinge assembly is structured to be disposed offset from the longitudinal centerline.

7. The hinge assembly of claim 1 wherein the primary member is structured to house a number of wires passing between the first and second portions of the housing.

8. The hinge assembly of claim 2 wherein the first hinge member comprises a first conduit portion, the second hinge member comprises a second conduit portion, and the first conduit portion and the second conduit portion are structured to house a number of wires passing between the first and second portions of the housing.

9. A handheld electronic device comprising:
    a housing including a first portion and a second portion; and
    a hinge assembly comprising:
        a primary member structured to hingedly couple the first portion to the second portion, the primary member configured to move between an closed position and an open position; and
        a secondary member coupled to and partially surrounding the primary member, the secondary member being configured to move about the primary member when the primary member is in the closed position, from
            an unlocked position, in which the primary member is permitted to move to the open position, to
            a locked position, in which the primary member is prevented from moving to the open position.

10. The handheld electronic device of claim 9 wherein the primary member comprises a first hinge member and a second hinge member; wherein the first hinge member is coupled to the first portion of the housing; wherein the second hinge member is coupled to the second portion of the housing; and wherein the first hinge member may pivot relative to the second hinge member about a first axis.

11. The handheld electronic device of claim 10 wherein the secondary member pivots about a second axis, said second axis being oriented generally perpendicular to said first axis.

12. The handheld electronic device of claim 9 wherein the housing of the handheld electronic device has a form factor; and wherein the secondary member is structured to be pivotable between a first position corresponding to the secondary member extending beyond the form factor, and a second position corresponding to the secondary member not extending beyond the form factor.

13. The handheld electronic device of claim 9 wherein the hinge assembly has a width and a depth; and wherein the width is about 40 to about 70 percent of the depth.

14. The handheld electronic device of claim 9 wherein the housing of the handheld electronic device has a longitudinal centerline extending through the first portion of the housing and the second portion of the housing; and wherein the hinge assembly is structured to be disposed offset from the longitudinal centerline.

15. The handheld electronic device of claim 9 wherein the primary member houses a number of wires passing between the first and second portions of the housing.

16. The handheld electronic device of claim 10 wherein the first hinge member comprises a first conduit portion, the second hinge member comprises a second conduit portion, and the first conduit portion and the second conduit portion house a number of wires passing between the first and second portions of the housing.

17. The handheld electronic device of claim 12 wherein the housing comprises a sensor for determining the position of the secondary member.

18. The handheld electronic device of claim 17 wherein the housing comprises a processor providing a number of functions, wherein at least one function is determined by the determination of the sensor.

19. A method of securing a handheld electronic device including a housing and a hinge assembly, said housing having a first portion including a first face and a second portion including a second face, said method comprising:
  pivoting one of the first and second portions with respect to the other of the first and second portions until the first and second faces are generally parallel with respect to each other; and
  following the pivoting, rotating a portion of the hinge member with respect to the housing, from
    an unlocked position, in which the first and second portions are permitted to pivot, to
    a locked position in which the first and second portions are prevented from pivoting.

20. The method of claim 19 wherein the one of the first and second portions pivots about a first axis; wherein the portion of the hinge member rotate about a second axis; and wherein the first axis and the second axis are oriented generally perpendicular with respect to each other.

* * * * *